(12) United States Patent
Wang et al.

(10) Patent No.: US 12,462,381 B2
(45) Date of Patent: Nov. 4, 2025

(54) SYSTEMS AND METHODS FOR COLOR MAPPINGS OF CONTRAST IMAGES

(71) Applicant: KONINKLIJKE PHILIPS N.V., Eindhoven (NL)

(72) Inventors: Shiying Wang, Melrose, MA (US); Claudia Errico, Cambridge, MA (US); William Tao Shi, Wakefield, MA (US); Thanasis Loupas, Kirkland, MA (US); Jeffry Earl Powers, Bainbridge Island, WA (US); Paul Sheeran, Woodinville, WA (US); Charles Tremblay-Darveau, Seattle, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 562 days.

(21) Appl. No.: 17/771,837

(22) PCT Filed: Oct. 29, 2020

(86) PCT No.: PCT/EP2020/080477
§ 371 (c)(1),
(2) Date: Apr. 26, 2022

(87) PCT Pub. No.: WO2021/084051
PCT Pub. Date: May 6, 2021

(65) Prior Publication Data
US 2022/0398725 A1    Dec. 15, 2022

Related U.S. Application Data

(60) Provisional application No. 62/929,519, filed on Nov. 1, 2019.

(51) Int. Cl.
*G06F 17/00* (2019.01)
*A61B 8/00* (2006.01)
*G06T 7/00* (2017.01)

(52) U.S. Cl.
CPC ............ *G06T 7/0012* (2013.01); *A61B 8/461* (2013.01); *A61B 8/481* (2013.01); *G06T 2207/10016* (2013.01); *G06T 2207/10132* (2013.01)

(58) Field of Classification Search
CPC ......... G06T 7/0012; G06T 2207/10016; G06T 2207/10132; A61B 8/461; A61B 8/481
See application file for complete search history.

(56) References Cited

U.S. PATENT DOCUMENTS

| | | |
|---|---|---|
| 6,048,311 A | 4/2000 | Washburn et al. |
| 6,443,896 B1 | 9/2002 | Detmer |

(Continued)

FOREIGN PATENT DOCUMENTS

| | | |
|---|---|---|
| EP | 2255731 A1 | 12/2010 |
| JP | 2008142569 A | 6/2008 |
| JP | 2015116371 A | 6/2015 |

OTHER PUBLICATIONS

International Search Report and Written Opinion for PCT/EP2020/080477; Mailing date: Jan. 13, 2021, 10 pages.

(Continued)

*Primary Examiner* — Mohammed H Zuberi

(57) ABSTRACT

Systems and methods for time-varying two-dimensional (2D) color maps for visualizing images or sequences of images are disclosed. The 2D color map may include brightness values of a hue corresponding to different intensities that changes over time. In some 2D color maps, the hue used for the intensity scale may change over time while the brightness of a pixel may not. In some 2D color maps, both the hue and the brightness may change relative to intensity over time.

20 Claims, 7 Drawing Sheets

(56) References Cited

U.S. PATENT DOCUMENTS

| | | | |
|---|---|---|---|
| 6,530,885 | B1 | 3/2003 | Entrekin et al. |
| 10,299,764 | B2* | 5/2019 | Steininger ............... A61B 8/523 |
| 10,326,973 | B2* | 6/2019 | Okabe .................. H04N 13/106 |
| 10,564,272 | B2* | 2/2020 | Mosegaard .......... G01S 15/8988 |
| 10,977,776 | B1* | 4/2021 | Krasowski ................ G09G 5/10 |
| 11,116,479 | B2* | 9/2021 | Gu ........................ A61B 8/5207 |
| 12,178,642 | B2* | 12/2024 | Rajguru ................. A61B 8/085 |
| 2012/0177265 | A1* | 7/2012 | Yoshiara ............... A61B 8/461 |
| | | | 382/128 |
| 2013/0116557 | A1 | 5/2013 | Yoshikawa |
| 2014/0005549 | A1* | 1/2014 | Hashimoto .............. A61B 8/06 |
| | | | 600/458 |
| 2015/0071516 | A1 | 3/2015 | Kim |
| 2015/0080730 | A1* | 3/2015 | Kanayama ............ G06T 7/0012 |
| | | | 600/447 |
| 2015/0245819 | A1* | 9/2015 | Yoshiara ............... A61B 8/0866 |
| | | | 600/431 |
| 2015/0257739 | A1 | 9/2015 | Yao et al. |
| 2016/0058421 | A1* | 3/2016 | Seo ...................... A61B 8/5223 |
| | | | 600/453 |
| 2016/0354060 | A1* | 12/2016 | Perrey .................... A61B 8/465 |
| 2017/0100037 | A1* | 4/2017 | Harmelin ............. A61B 5/0042 |
| 2017/0120080 | A1* | 5/2017 | Phillips .................. A61B 34/25 |
| 2018/0185010 | A1 | 7/2018 | Gu et al. |
| 2018/0214009 | A1* | 8/2018 | Endo ...................... A61B 1/063 |
| 2020/0357146 | A1* | 11/2020 | Vallespi ................ G06T 11/001 |
| 2022/0104788 | A1* | 4/2022 | Ji ............................. A61B 8/06 |

OTHER PUBLICATIONS

Wronkowicz A. et al., "3D Reconstruction of Ultrasonic B-Scans for Nondestructive Testing of Composites", International Conference on Computer Vision and Graphics, 2016, Abstract only.

Wakui N. et al., "Arrival time parametric imaging using Sonazoid-enhanced ultrasonography is useful for the detection of spoke-wheel patterns of focal nodular hyperplasia smaller than 3 cm", Exp Ther Med. 2013, vol. 5, No. 6, pp. 1551-1554.

Kogan P. et al., "Validation of dynamic contrast-enhanced ultrasound in rodent kidneys as an absolute quantitative method for measuring blood perfusion", Ultrasound Med Biol., 2011, vol. 37, No. 6, pp. 900-908.

Fujita, Y. et al., "Assessment of the distribution of renal cortical blood flow by contrast ultrasonography," Journal of the Japanese Society of Nephrology, 1994, vol. 36, No. 3, pp. 218-226.

* cited by examiner

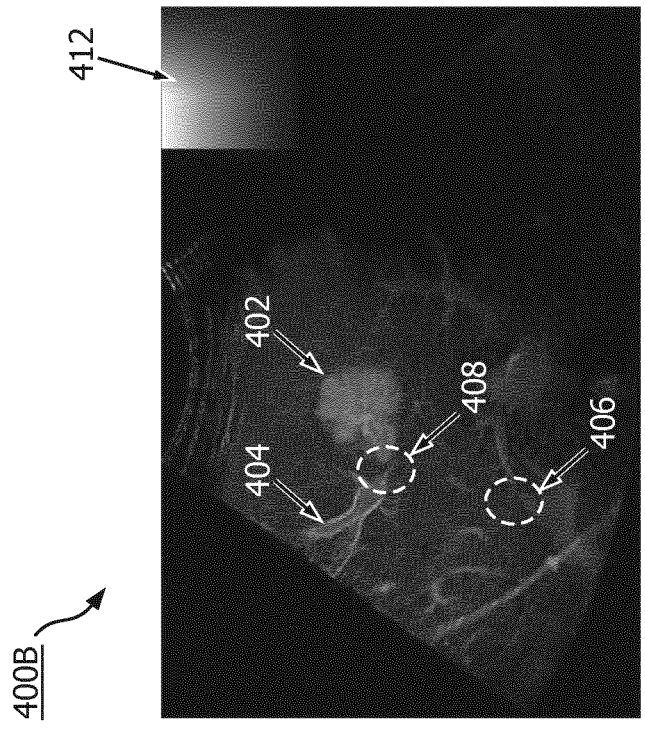
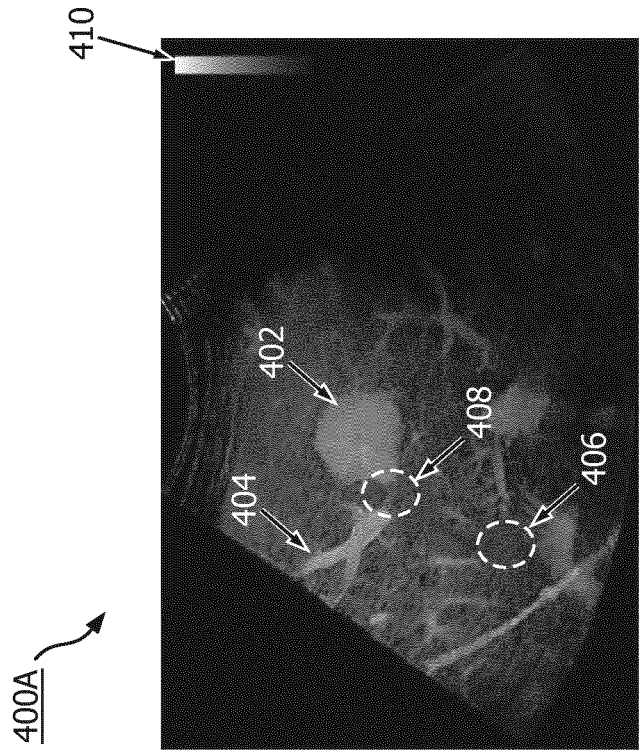
FIG. 4A
FIG. 4B

SYSTEMS AND METHODS FOR COLOR MAPPINGS OF CONTRAST IMAGES

CROSS-REFERENCE TO PRIOR APPLICATIONS

This application is the U.S. National Phase application under 35 U.S.C. § 371 of International Application No. PCT/EP2020/080477, filed on Oct. 29, 2020, which claims the benefit of U.S. Provisional Patent Application No. 62/929,519, filed on Nov. 1, 2019. These applications are hereby incorporated by reference herein.

TECHNICAL FIELD

This application relates to contrast enhanced imaging. More specifically, this application relates to mappings, such as color mappings, of contrast enhanced images.

BACKGROUND

In microbubble contrast-enhanced ultrasound (CEUS) imaging, the tissue of interest is scanned with a microbubble-specific ultrasonic imaging mode and an intravenous bolus of an ultrasound contrast medium is given to the patient. Ultrasound images are acquired as the contrast washes into and out of the lesion over the duration of the bolus. Typically, image acquisition parameters are maintained for the entire sequence. An on-screen elapsed-time display may be activated when the bolus is injected to provide an indication of the time between injection and image acquisition. The pattern of wash-in and wash-out of contrast agent in a lesion may provide information that is used for clinical diagnosis in some applications. The images may be viewed as a sequence (e.g., a cineloop) to allow a clinician or other user to observe the wash-in and wash-out of the contrast agent. The clinical images may be provided in grayscale or other single color (e.g., sepia) where the brightness of a pixel in the image corresponds to an intensity of the ultrasound signal acquired at a location corresponding to the pixel. An example of a one dimensional color map 800 that links ultrasound signal intensity to pixel brightness in an image is shown in FIG. 8.

SUMMARY

Systems and methods for providing two dimensional (2D) color maps which may provide information with respect to multiple parameters related to contrast imaging are disclosed. As opposed to a mapping of one parameter, the systems and methods may use a combination of hue and/or intensity that can change over time to show multiple parameters in a single color map. The multiple parameters in a single 2D color map may include time of arrival, time of flight, microbubble concentration, flow rate, and/or perfusion rate.

In accordance with at least one example disclosed herein, an ultrasound imaging system may include an ultrasound probe configured to receive ultrasound signals for generating a sequence of ultrasound images, and a processor configured to apply a time-varying color map for representing an intensity of the ultrasound signals in the sequence, wherein the time-varying color map comprises a two-dimensional (2D) color map that associates a given intensity of an ultrasound signal to at least one of a brightness value or a hue value that changes over time, and generate individual ultrasound images of the sequence for display by assigning, in accordance with the time-varying color map, different brightness or hue values to pixels representing a same intensity ultrasound signals acquired at different points in time.

In accordance with at least one example disclosed herein, a method may include receiving a sequence of ultrasound images, wherein each image of the sequence of ultrasound images is acquired at a different time point, applying a time-varying color map to individual ultrasound images of the sequence, wherein the time-varying color map comprises a two-dimensional (2D) color map that that associates a given intensity of an ultrasound signal to at least one of a brightness value or a hue value that changes over time, and wherein applying the time-varying color map comprises assigning, for individual images of the sequence, different ones of the at least one of the brightness values or the hue values to pixels representing a same intensity ultrasound signals acquired at different time points, and displaying the sequence of ultrasound images.

In accordance with at least one example disclosed herein, a non-transitory computer readable medium may include instructions that when executed may cause an ultrasound imaging system to receive a sequence of ultrasound images, wherein each image of the sequence of ultrasound images is acquired at a different time point, apply a time-varying color map to individual ultrasound images of the sequence, wherein the time-varying color map comprises a two-dimensional (2D) color map that that associates a given intensity of an ultrasound signal to at least one of a brightness value or a hue value that changes over time, and wherein applying the time-varying color map comprises assigning, for individual images of the sequence, different ones of the at least one of the brightness values or the hue values to pixels representing a same intensity ultrasound signals acquired at different time points, and display the sequence of ultrasound images.

BRIEF DESCRIPTION OF THE DRAWINGS

FIG. 4A is an example contrast-enhanced ultrasound image of a liver generated with a one-dimensional color map.

FIG. 4B is an example contrast-enhanced ultrasound image of a liver generated with a two-dimensional color map according to embodiments of the present disclosure.

DESCRIPTION

The following description of certain exemplary examples is merely exemplary in nature and is in no way intended to limit the invention or its applications or uses. In the following detailed description of examples of the present systems and methods, reference is made to the accompanying drawings which form a part hereof, and in which are shown by way of illustration specific examples in which the described systems and methods may be practiced. These examples are described in sufficient detail to enable those skilled in the art to practice the presently disclosed systems and methods, and it is to be understood that other examples may be utilized and that structural and logical changes may be made without departing from the spirit and scope of the present system. Moreover, for the purpose of clarity, detailed descriptions of certain features will not be discussed when they would be apparent to those with skill in the art so as not to obscure the description of the present system. The following detailed description is therefore not to be taken in a limiting sense, and the scope of the present system is defined only by the appended claims.

As previously mentioned, a color map with a fixed hue is used to color-code ultrasound signal intensities by brightness in CEUS imaging (e.g., low intensities are represented by black pixels, medium intensities are represented by gray pixels, high intensities are represented by white pixels). A color map may also use a fixed set of hues to color-code ultrasound intensities in CEUS imaging (e.g., low intensities are represented by blue pixels, medium intensities are represented by yellow pixels, high intensities are represented by red pixels). In either case, the color map is typically not time-varying. That is, the mapping of signal intensity to brightness or hue is fixed over time for all of the images in a sequence. In other words, the color map is one-dimensional (1D). Consequently, some characteristics of the sequence that change over time cannot be adequately visualized. For example, for some organs such as the liver, there are distinct phases of enhancement: arterial phase, portal venous phase, and parenchymal phase. In liver CEUS imaging, contrast images tend to saturate for an amount of time after perfusion of the contrast agent through the organ. In late arterial phase of liver imaging, the arteries and branches become less distinguishable due to contrast saturation in microvasculature.

Some imaging systems provide parametric display of the contrast images, in which time-to-peak, time-of-arrival, wash-out rate, etc. are calculated and displayed to the user. The 1D color maps are not suitable for time-varying parametric imaging, and various steps of thresholding with altered 1D color maps may be required. Accordingly, improved visualization of CEUS imaging is desired.

Figure 8:
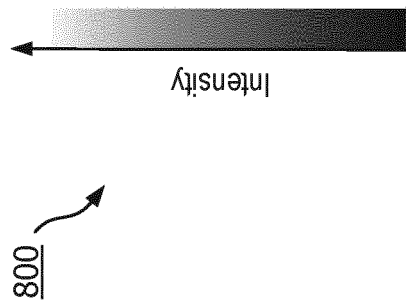
FIG. 8 is a one dimensional color map.

According to principles of the present disclosure, time-varying two-dimensional (2D) color maps may be used for visualizing CEUS image sequences or other image sequences. In some examples, a single color, referred to as a hue, may be used for an intensity scale similar to the 1D color map 800 shown in FIG. 8. However, unlike the 1D color map, the brightness values of the hue corresponding to different intensities changes over time. In some examples, the hue used for the intensity scale may change over time. That is, while the brightness of a pixel may not change relative to intensity over time, the hue of the pixel may change over time. In still other examples, both the hue and the brightness may change relative to intensity over time.

Figure 1B:
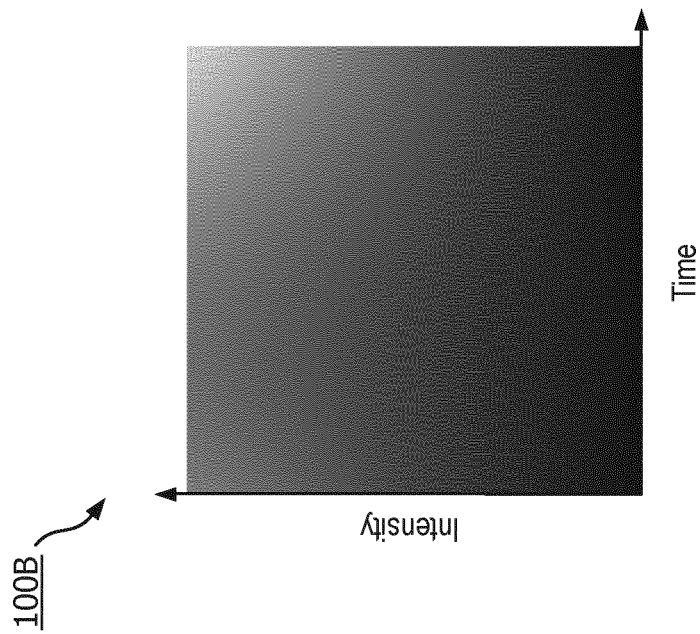
FIGS. 1A and 1B are examples of two-dimensional color maps according to principles of the present disclosure.
Figure 1A:
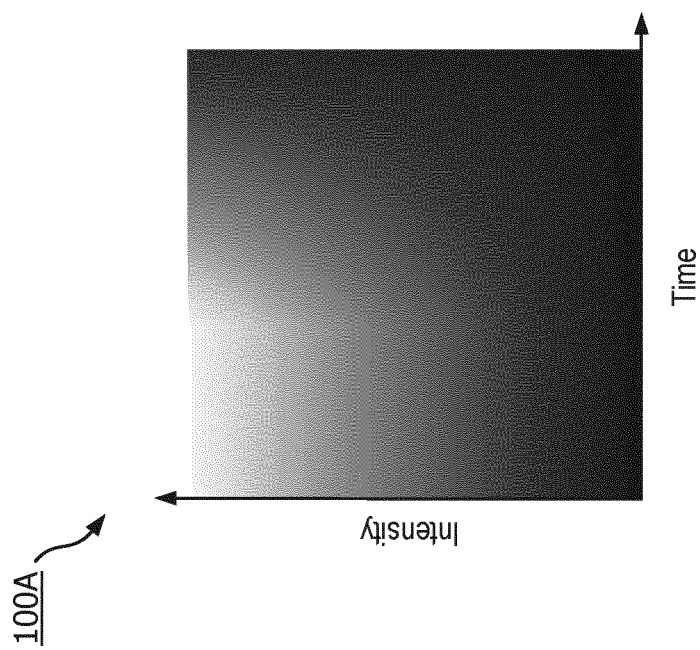

FIGS. 1A and 1B are examples of 2D color maps according to principles of the present disclosure. FIG. 1A is a 2D color map 100A that includes a single hue with an intensity scale that changes over time. At early time points, high intensity ultrasound signals correspond to bright pixels (e.g., white or near white). As time progresses, high intensity ultrasound signals correspond to darker and darker pixels (e.g., shades of gray or sepia). During CEUS imaging, at early time points, little to no contrast agent has reached or accumulated in the organ of interest. Thus, the ultrasound signal intensity due to the contrast agent will be low in most, if not all areas of the ultrasound image. Accordingly, the number of pixels that will be at the peak value of the color map (e.g., white) for intensity will be low and may not hinder a user's ability to view other areas of the organ. As time progresses, more contrast agent may reach and/or accumulate in the organ and the ultrasound signal intensities due to the contrast agent may increase. If the color map remained the same, more areas of the image would include pixels at the peak value of the color map causing saturation, which may inhibit the user's ability to view other areas of the organ (e.g., saturation in tissue may prevent viewing of smaller vessels within the tissue).

FIG. 1B is a 2D color map 100B that includes an intensity scale that varies in hue over time. At early time points, high intensity ultrasound signals correspond to bright pink pixels and low intensity ultrasound signals correspond to dark pink or black pixels. As time progresses, the intensity scale shifts from purple to blue to teal. At late time points, high intensity ultrasound signals correspond to bright teal pixels and low intensity ultrasound signals correspond to dark teal or black pixels. The changing hue of an intensity level over time may allow a user to visualize when ultrasound signals from the contrast agent in different areas of an organ reach the intensity level. That is, the different hues may allow a user to discern which areas of the organ received and/or accumulated the contrast agent first, for example, for determining time-of arrival. The different hues and/or different hues in combination with brightness may allow a user to determine areas of the organ where contrast intensity reaches the peak first, for example, for determining time-to-peak. Using the example 2D color map 100B, areas of the organ that receive and/or accumulate contrast during early time points may appear pink whereas areas of the organ that receive and/or accumulate contrast agent during later time points may appear teal.

Figure 2:
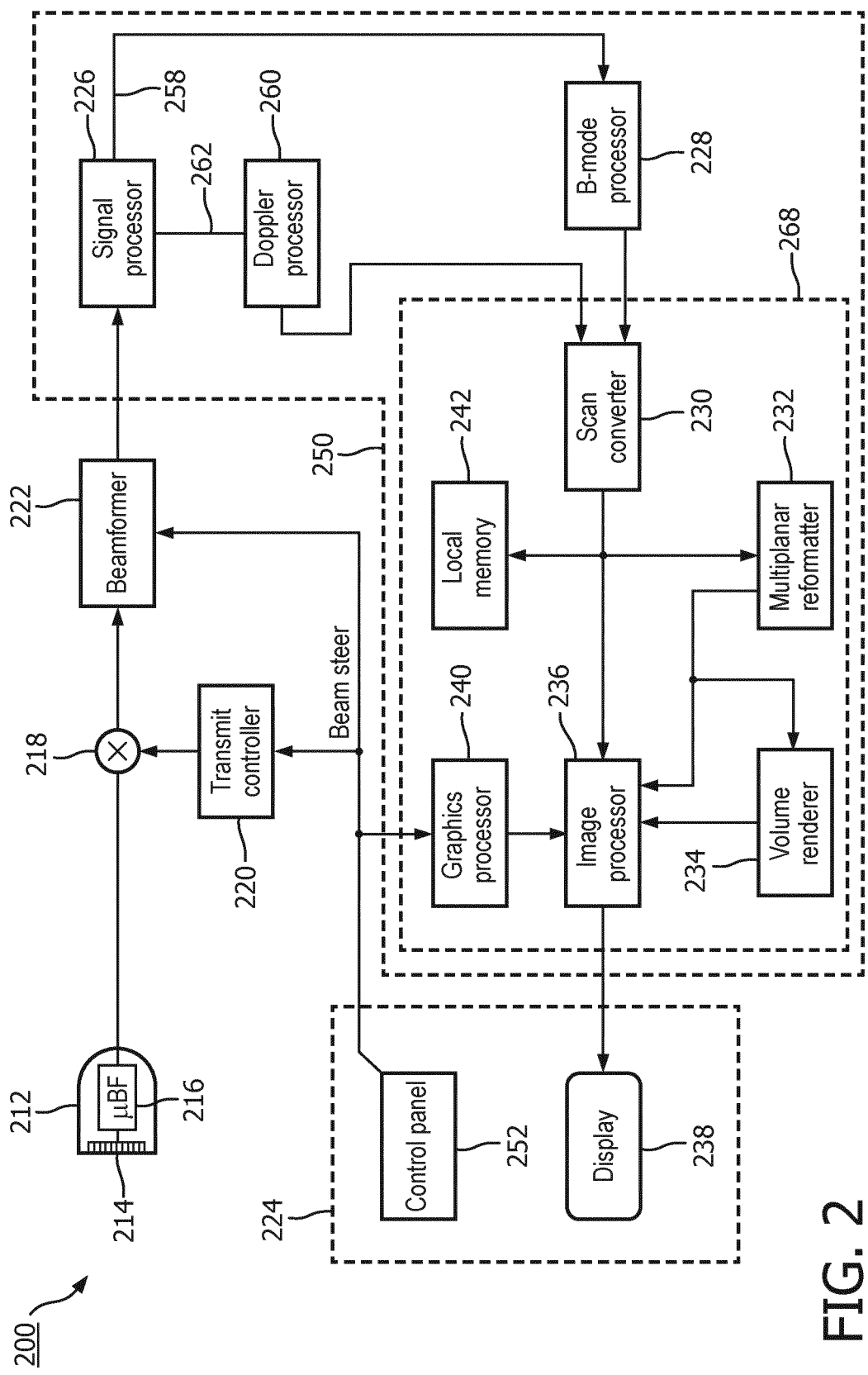
FIG. 2 is a block diagram of an ultrasound imaging system arranged in accordance with some examples of the present disclosure.

FIG. 2 shows a block diagram of an ultrasound imaging system 200 constructed in accordance with the principles of the present disclosure. An ultrasound imaging system 200 according to the present disclosure may include a transducer array 214, which may be included in an ultrasound probe 212, for example an external probe or an internal probe such as an intravascular ultrasound (IVUS) catheter probe. In other examples, the transducer array 214 may be in the form of a flexible array configured to be conformally applied to a surface of subject to be imaged (e.g., patient). The transducer array 214 is configured to transmit ultrasound signals (e.g., beams, waves) and receive echoes (e.g., received ultrasound signals) responsive to the transmitted ultrasound signals. A variety of transducer arrays may be used, e.g., linear arrays, curved arrays, or phased arrays. The transducer array 214, for example, can include a two dimensional array (as shown) of transducer elements capable of scanning in both elevation and azimuth dimensions for 2D and/or 3D imaging. As is generally known, the axial direction is the direction normal to the face of the array (in the case of a curved array the axial directions fan out), the azimuthal direction is defined generally by the longitudinal dimension of the array, and the elevation direction is transverse to the azimuthal direction.

In some examples, the transducer array 214 may be coupled to a microbeamformer 216, which may be located in the ultrasound probe 212, and which may control the transmission and reception of signals by the transducer elements in the array 214. In some examples, the microbeamformer 216 may control the transmission and reception of signals by active elements in the array 214 (e.g., an active subset of elements of the array that define the active aperture at any given time).

In some examples, the microbeamformer 216 may be coupled, e.g., by a probe cable or wirelessly, to a transmit/receive (T/R) switch 218, which switches between transmission and reception and protects the main beamformer 222 from high energy transmit signals. In some examples, for example in portable ultrasound systems, the T/R switch 218 and other elements in the system can be included in the ultrasound probe 212 rather than in the ultrasound system base, which may house the image processing electronics. An ultrasound system base typically includes software and hardware components including circuitry for signal processing and image data generation as well as executable instructions for providing a user interface.

The transmission of ultrasonic signals from the transducer array 214 under control of the microbeamformer 216 is directed by the transmit controller 220, which may be coupled to the T/R switch 218 and a main beamformer 222. The transmit controller 220 may control the direction in which beams are steered. Beams may be steered straight ahead from (orthogonal to) the transducer array 214, or at different angles for a wider field of view. The transmit controller 220 may also be coupled to a user interface 224 and receive input from the user's operation of a user control. The user interface 224 may include one or more input devices such as a control panel 252, which may include one or more mechanical controls (e.g., buttons, encoders, etc.), touch sensitive controls (e.g., a trackpad, a touchscreen, or the like), and/or other known input devices.

In some examples, the partially beamformed signals produced by the microbeamformer 216 may be coupled to a main beamformer 222 where partially beamformed signals from individual patches of transducer elements may be combined into a fully beamformed signal. In some examples, microbeamformer 216 is omitted, and the transducer array 214 is under the control of the beamformer 222 and beamformer 222 performs all beamforming of signals. In examples with and without the microbeamformer 216, the beamformed signals of beamformer 222 are coupled to processing circuitry 250, which may include one or more processors (e.g., a signal processor 226, a B-mode processor 228, a Doppler processor 260, and one or more image generation and processing components 268) configured to produce an ultrasound image from the beamformed signals (i.e., beamformed RF data).

The signal processor 226 may be configured to process the received beamformed RF data in various ways, such as bandpass filtering, decimation, I and Q component separation, and harmonic signal separation. The signal processor 226 may also perform additional signal enhancement such as speckle reduction, signal compounding, and electronic noise elimination. The processed signals (also referred to as I and Q components or IQ signals) may be coupled to additional downstream signal processing circuits for image generation. The IQ signals may be coupled to a plurality of signal paths within the system, each of which may be associated with a specific arrangement of signal processing components suitable for generating different types of image data (e.g., B-mode image data, Doppler image data). For example, the system may include a B-mode signal path 258 which couples the signals from the signal processor 226 to a B-mode processor 228 for producing B-mode image data.

The B-mode processor 228 can employ amplitude detection for the imaging of structures in the body. According to principles of the present disclosure, the B-mode processor 228 may generate signals for tissue images and/or contrast images. The signals produced by the B-mode processor 228 may be coupled to a scan converter 230 and/or a multiplanar reformatter 232. The scan converter 230 may be configured to arrange the echo signals from the spatial relationship in which they were received to a desired image format. For instance, the scan converter 230 may arrange the echo signal into a two dimensional (2D) sector-shaped format, or a pyramidal or otherwise shaped three dimensional (3D) format. In another example of the present disclosure, the scan converter 230 may arrange the echo signals into side-by-side contrast enhanced and tissue images.

The multiplanar reformatter 232 can convert echoes which are received from points in a common plane in a volumetric region of the body into an ultrasonic image (e.g., a B-mode image) of that plane, for example as described in U.S. Pat. No. 6,443,896 (Detmer). The scan converter 230 and multiplanar reformatter 232 may be implemented as one or more processors in some examples.

A volume renderer 234 may generate an image (also referred to as a projection, render, or rendering) of the 3D dataset as viewed from a given reference point, e.g., as described in U.S. Pat. No. 6,530,885 (Entrekin et al.). The volume renderer 234 may be implemented as one or more processors in some examples. The volume renderer 234 may generate a render, such as a positive render or a negative render, by any known or future known technique such as surface rendering and maximum intensity rendering.

In some examples, the system may include a Doppler signal path 262 which couples the output from the signal processor 226 to a Doppler processor 260. The Doppler processor 260 may be configured to estimate the Doppler shift and generate Doppler image data. The Doppler image data may include color data which is then overlaid with B-mode (i.e. grayscale) image data for display. The Doppler processor 260 may be configured to filter out unwanted signals (i.e., noise or clutter associated with non-moving tissue), for example using a wall filter. The Doppler processor 260 may be further configured to estimate velocity and power in accordance with known techniques. For example, the Doppler processor may include a Doppler estimator such as an auto-correlator, in which velocity (Doppler frequency) estimation is based on the argument of the lag-one autocorrelation function and Doppler power estimation is based on the magnitude of the lag-zero autocorrelation function. Motion can also be estimated by known phase-domain (for example, parametric frequency estimators such as MUSIC, ESPRIT, etc.) or time-domain (for example, cross-correlation) signal processing techniques. Other estimators related to the temporal or spatial distributions of velocity such as estimators of acceleration or temporal and/or spatial velocity derivatives can be used instead of or in addition to velocity estimators. In some examples, the velocity and power estimates may undergo further threshold detection to further reduce noise, as well as segmentation and post-processing such as filling and smoothing. The velocity and power estimates may then be mapped to a desired range of display colors in accordance with a color map. The color data, also referred to as Doppler image data, may then be coupled to the scan converter 230, where the Doppler image data may be converted to the desired image format and overlaid on the B-mode image of the tissue structure to form a color Doppler or a power Doppler image. For example, Doppler image data may be overlaid on a B-mode image of the tissue structure.

Output (e.g., B-mode images, Doppler images) from the scan converter 230, the multiplanar reformatter 232, and/or the volume renderer 334 may be coupled to an image processor 236 for further enhancement, buffering and temporary storage before being displayed on an image display 238.

According to principles of the present disclosure, the image processor 236 may assign brightness and/or hue values to pixels of each image in a sequence of images based on a two-dimensional (2D) color map (e.g., color map 100A and/or color map 100B). The values may be provided by the image processor 236 to the display 238. The values may define a brightness and/or hue with which the pixel appears on the display 238. The 2D color map may define a relationship between an intensity of an ultrasound signal at a location corresponding to the pixel and the brightness and/or hue of the pixel for a given point in time. The brightness and/or hue that corresponds to an intensity of the ultrasound signal may vary over time (e.g., across images of the sequence acquired at different points in time).

In some embodiments, the 2D color map may be generated by the image processor 236. In some embodiments, how the hue and/or brightness changes with intensity over time may be predefined. For example, a rate at which the brightness and/or hue changes for a given intensity level may be predefined. In some embodiments, the rate of change may be based at least in part, on a type of organ being imaged (e.g., liver, thyroid), a type of contrast agent used, image acquisition settings (e.g., gain, transmit frequency), and/or a type of parameter being studied (e.g., time-of-arrival, clearance).

In other embodiments, the rate of change may be dynamic. In some embodiments, how the brightness and/or hue changes with intensity over time, such as the rate of change, may vary based on analysis of the images either in real time or in post-processing. For example, the image processor 236 may analyze the image to determine the intensities of the ultrasound signals for all of the pixels in the image and may adjust the intensity scale of the color map for each image in the sequence so that no more than a threshold value of pixels are at a peak value for the brightness and/or hue in the image. The threshold value may be a percentage in some examples (e.g., 0.1%, 1%, 5%). In another example, such as parametric imaging, the rate of change of the brightness and/or hue for a given intensity may be based on a parameter calculated by the image processor. For example, images of the sequence may be analyzed to determine a time-to-peak, time-of-arrival, wash-out rate, and/or other desired parameter of a contrast agent (e.g., concentration, flow rate, perfusion rate). Based on the calculated parameter, the 2D color map may be determined and brightness and/or hue values of the pixels may then be assigned.

Although reference is made to pixels, it is understood that the principles of the present disclosure may also be applied to voxels of three dimensional images.

In some embodiments, whether the 2D color map corresponds to a change in brightness corresponding to an intensity over time, a change in hue corresponding to an intensity over time, or a combination thereof, may be determined by a user, for example, via the user interface 224. In some embodiments, whether the change of the 2D color map over time is predetermined or dynamic may be determined by the user via the user interface 224.

A graphics processor 240 may generate graphic overlays for display with the images. These graphic overlays can contain, e.g., standard identifying information such as patient name, date and time of the image, imaging parameters, and the like. For these purposes the graphics processor may be configured to receive input from the user interface 224, such as a typed patient name or other annotations. The user interface 224 can also be coupled to the multiplanar reformatter 232 for selection and control of a display of multiple multiplanar reformatted (MPR) images.

The system 200 may include local memory 242. Local memory 242 may be implemented as any suitable non-transitory computer readable medium (e.g., flash drive, disk drive). Local memory 242 may store data generated by the system 200 including B-mode images, masks, executable instructions, inputs provided by a user via the user interface 224, or any other information necessary for the operation of the system 200.

As mentioned previously system 200 includes user interface 224. User interface 224 may include display 238 and control panel 252. The display 238 may include a display device implemented using a variety of known display technologies, such as LCD, LED, OLED, or plasma display technology. In some examples, display 238 may comprise multiple displays. The control panel 252 may be configured to receive user inputs (e.g., exam type, format of color map). The control panel 252 may include one or more hard controls (e.g., buttons, knobs, dials, encoders, mouse, trackball or others). In some examples, the control panel 252 may additionally or alternatively include soft controls (e.g., GUI control elements or simply, GUI controls) provided on a touch sensitive display. In some examples, display 238 may be a touch sensitive display that includes one or more soft controls of the control panel 252.

In some examples, various components shown in FIG. 2 may be combined. For instance, image processor 236 and graphics processor 240 may be implemented as a single processor. In another example, the scan converter 230 and multiplanar reformatter 232 may be implemented as a single processor. In some examples, various components shown in FIG. 2 may be implemented as separate components. For example, signal processor 226 may be implemented as separate signal processors for each imaging mode (e.g., B-mode, Doppler). In some examples, one or more of the various processors shown in FIG. 2 may be implemented by general purpose processors and/or microprocessors configured to perform the specified tasks. In some examples, one or more of the various processors may be implemented as application specific circuits. In some examples, one or more of the various processors (e.g., image processor 236) may be implemented with one or more graphical processing units (GPU).

Figure 3:
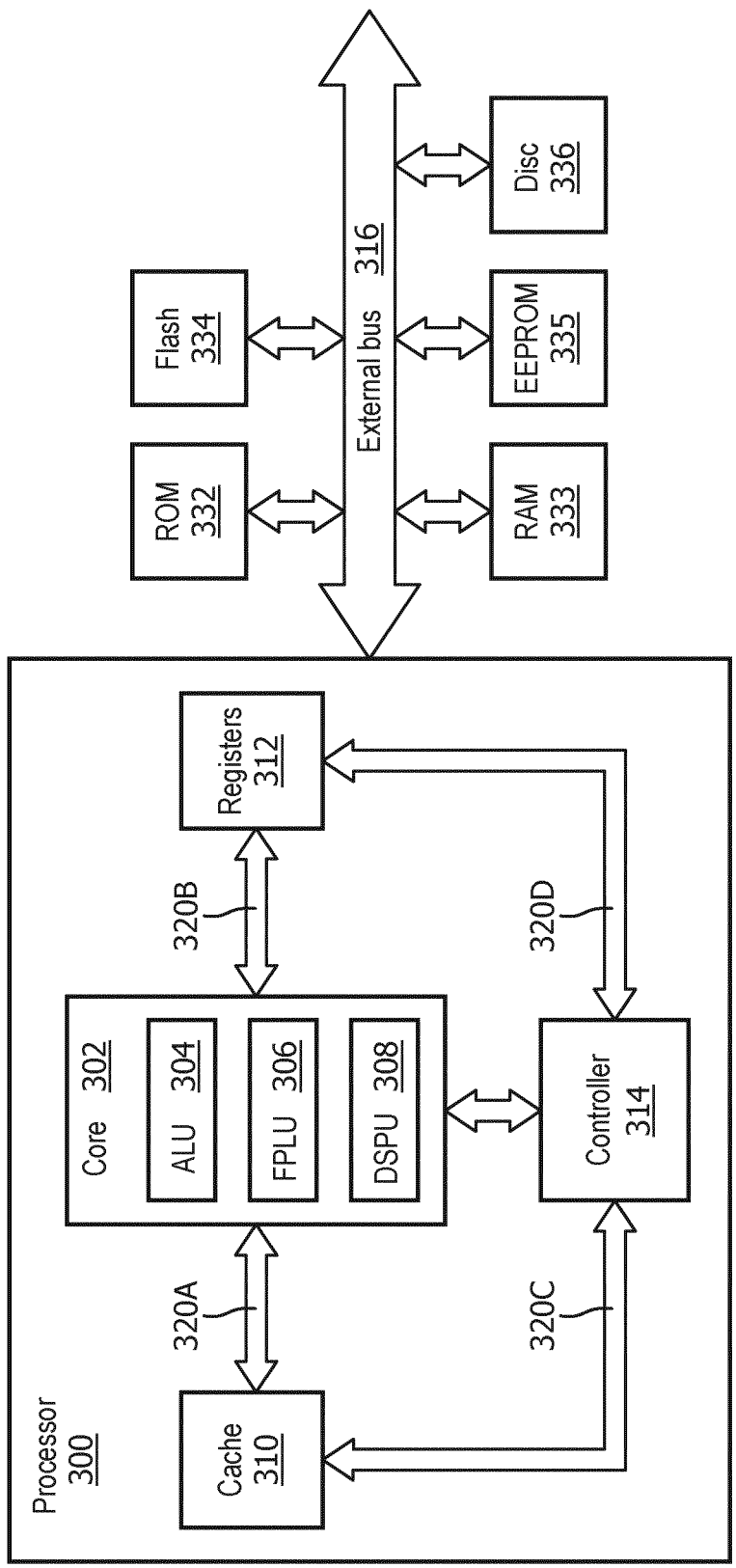
FIG. 3 is a block diagram illustrating an example processor in accordance with some examples of the present disclosure.

FIG. 3 is a block diagram illustrating an example processor 300 according to principles of the present disclosure. Processor 300 may be used to implement one or more processors described herein, for example, image processor 236 shown in FIG. 1. Processor 300 may be any suitable processor type including, but not limited to, a microprocessor, a microcontroller, a digital signal processor (DSP), a field programmable array (FPGA) where the FPGA has been programmed to form a processor, a graphical processing unit (GPU), an application specific circuit (ASIC) where the ASIC has been designed to form a processor, or a combination thereof.

The processor 300 may include one or more cores 302. The core 302 may include one or more arithmetic logic units (ALU) 804. In some examples, the core 302 may include a floating point logic unit (FPLU) 306 and/or a digital signal processing unit (DSPU) 308 in addition to or instead of the ALU 304.

The processor 300 may include one or more registers 312 communicatively coupled to the core 302. The registers 312 may be implemented using dedicated logic gate circuits (e.g., flip-flops) and/or any memory technology. In some examples the registers 312 may be implemented using static memory. The register may provide data, instructions and addresses to the core 302.

In some examples, processor 300 may include one or more levels of cache memory 310 communicatively coupled to the core 302. The cache memory 310 may provide computer-readable instructions to the core 302 for execution. The cache memory 810 may provide data for processing by the core 302. In some examples, the computer-readable instructions may have been provided to the cache memory 310 by a local memory, for example, local memory attached to the external bus 316. The cache memory 310 may be implemented with any suitable cache memory type, for example, metal-oxide semiconductor (MOS) memory such as static random access memory (SRAM), dynamic random access memory (DRAM), and/or any other suitable memory technology.

The processor 300 may include a controller 314, which may control input to the processor 300 from other processors and/or components included in a system (e.g., control panel 252 and scan converter 230 shown in FIG. 1) and/or outputs from the processor 300 to other processors and/or components included in the system (e.g., display 238 and volume renderer 234 shown in FIG. 1). Controller 314 may control the data paths in the ALU 304, FPLU 306 and/or DSPU 308. Controller 314 may be implemented as one or more state machines, data paths and/or dedicated control logic. The gates of controller 314 may be implemented as standalone gates, FPGA, ASIC or any other suitable technology.

The registers 312 and the cache 310 may communicate with controller 314 and core 302 via internal connections 320A, 320B, 320C and 320D. Internal connections may implemented as a bus, multiplexor, crossbar switch, and/or any other suitable connection technology.

Inputs and outputs for the processor 300 may be provided via a bus 316, which may include one or more conductive lines. The bus 316 may be communicatively coupled to one or more components of processor 300, for example the controller 314, cache 310, and/or register 312. The bus 316 may be coupled to one or more components of the system, such as display 238 and control panel 252 mentioned previously.

The bus 316 may be coupled to one or more external memories. The external memories may include Read Only Memory (ROM) 332. ROM 332 may be a masked ROM, Electronically Programmable Read Only Memory (EPROM) or any other suitable technology. The external memory may include Random Access Memory (RAM) 333. RAM 333 may be a static RAM, battery backed up static RAM, Dynamic RAM (DRAM) or any other suitable technology. The external memory may include Electrically Erasable Programmable Read Only Memory (EEPROM) 335. The external memory may include Flash memory 334. The external memory may include a magnetic storage device such as disc 336. In some examples, the external memories may be included in a system, such as ultrasound imaging system 200 shown in FIG. 2, for example local memory 242.

FIG. 4A is an example contrast-enhanced ultrasound (CEUS) image 400A of a liver generated with a one-dimensional color map 410. FIG. 4B is an example CEUS image 400B of the liver generated with a two-dimensional color map 412 according to embodiments of the present disclosure. Both images were generated from ultrasound signals acquired at a same time point (e.g., the same image in a sequence of images acquired over time). In both image 400A and 400B, a lesion 402 and a large branched blood vessel 404 are visible due to the presence of contrast agent. However, in image 400A, enough contrast agent has accumulated in the liver tissue such that the image has begun to saturate and obscure smaller vasculature. For example, as indicated by circles 406 and 408, smaller vessels obscured by saturation in image 400A are visible in image 400B due to a change in the intensity scale of the images over time, which may penalize pixels with late time-of-arrival in some examples.

Figure 5B:
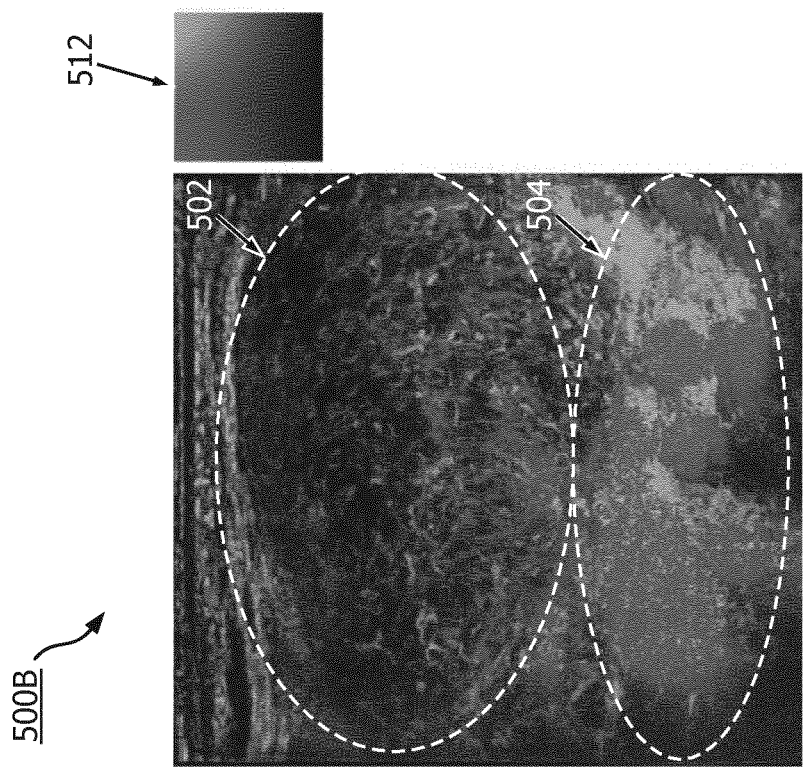
FIG. 5B is an example contrast-enhanced ultrasound image of a thyroid generated with a two-dimensional color map according to embodiments of the present disclosure.
Figure 5A:
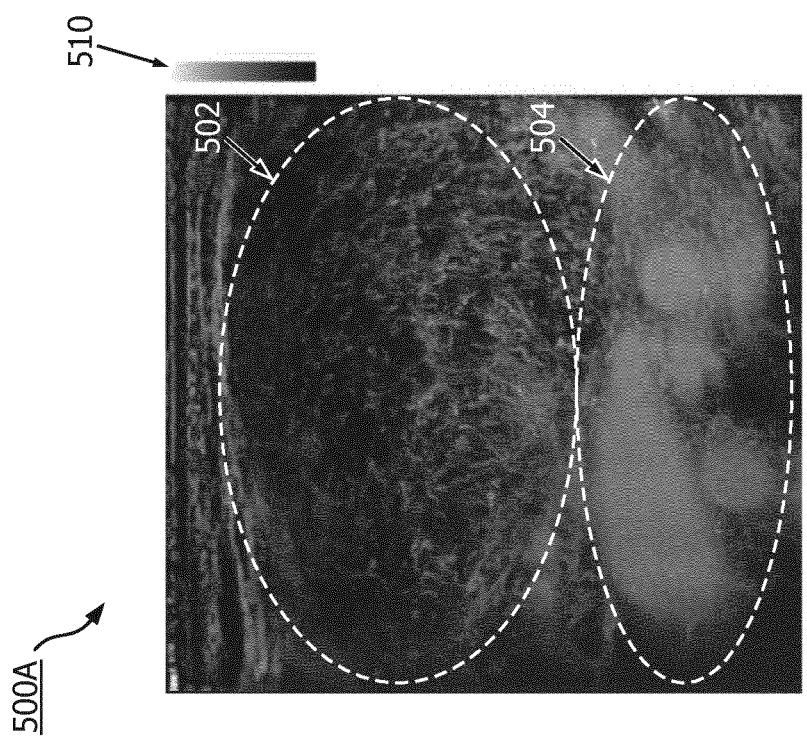
FIG. 5A is an example contrast-enhanced ultrasound image of a thyroid generated with a one-dimensional color map.

FIG. 5A is an example CEUS image 500A of a thyroid generated with a one-dimensional color map 510. FIG. 5B is an example CEUS image 500B of a thyroid generated with a two-dimensional color map 512 according to embodiments of the present disclosure. Both images were generated from ultrasound signals acquired at a same time point (e.g., the same image in a sequence of images acquired over time). In both images, a lesion may be seen in the region within circle 502 and nodules may be seen below in the region indicated by circle 504. While contrast agent is present in the vasculature of the lesion and within the nodules, in image 500A, it is unknown which areas of the lesion and nodules received and/or accumulated contrast agent prior to other areas. However, in image 500B, areas of the lesion and nodules that received and/or accumulated contrast agent at early time points are displayed in pink whereas areas that received and/or accumulated contrast agent at later time points are displayed in teal, based on a calculated time-of-arrival. Furthermore, the brightness of each hue indicates ultrasound signal intensity. Thus, both time of arrival and intensity information can be viewed simultaneously.

Figure 6A:
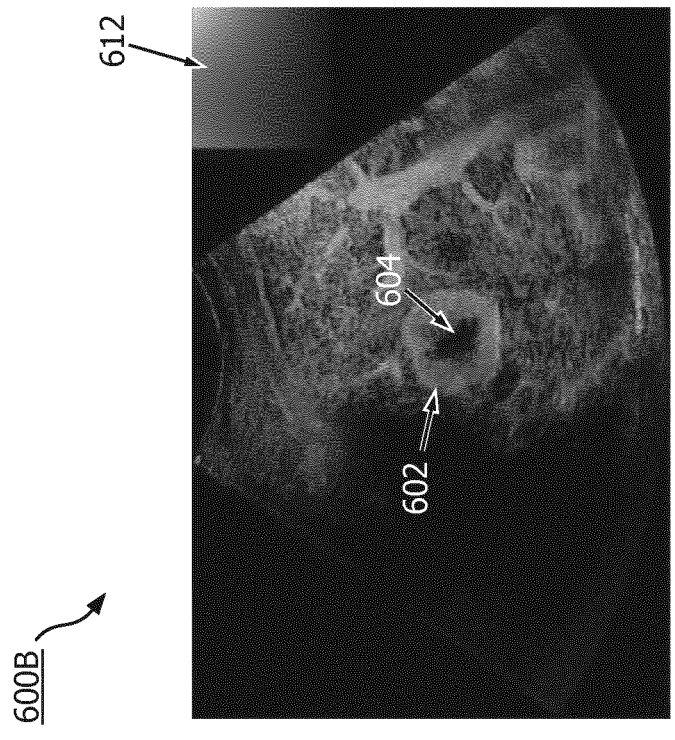
FIG. 6A is an example contrast-enhanced ultrasound image of a liver generated with a one-dimensional color map.
Figure 6B:
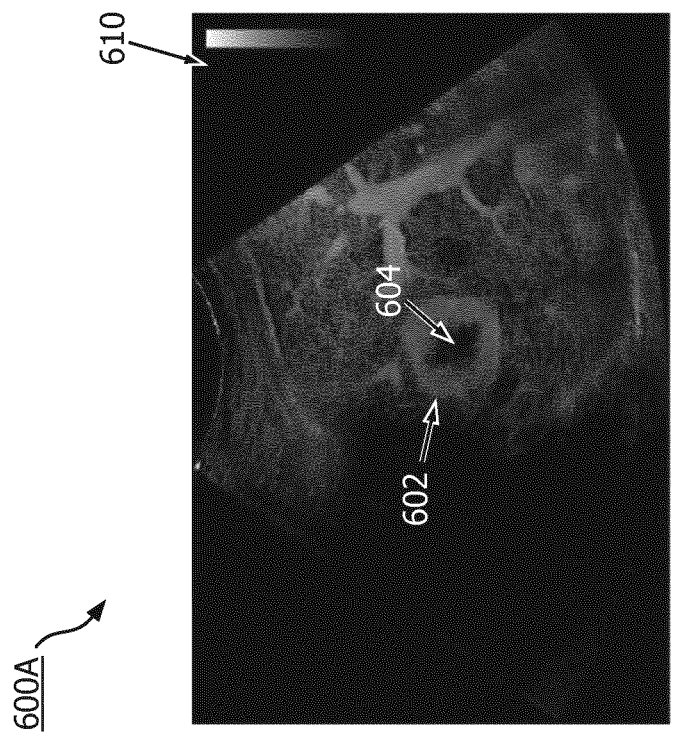
FIG. 6B is an example contrast-enhanced ultrasound image of a liver generated with a two-dimensional color map according to embodiments of the present disclosure.

FIG. 6A is an example CEUS image 600A of a liver generated with a one-dimensional color map 610. FIG. 6B is an example CEUS image 600B of a liver generated with a two-dimensional color map according to embodiments of the present disclosure. Both images were generated from ultrasound signals acquired at a same time point (e.g., the same image in a sequence of images acquired over time). In both images, a lesion 602 with a necrotic core 604 may be seen. While contrast agent is present in the vasculature of the lesion 602, in image 600A, it is unknown which areas of the lesion 602 and surrounding liver tissue received and/or accumulated contrast agent prior to other areas. However, in image 600B, areas of the lesion 602 and tissue that received and/or accumulated contrast agent at early time points are displayed in pink whereas areas that received and/or accumulated contrast agent at later time points are displayed in teal based on a calculated time-of-arrival. Furthermore, the brightness of each hue indicates ultrasound signal intensity. Thus, both time of arrival and intensity information can be viewed simultaneously. While teal and pink are used in the examples herein, it is understood that other hues and/or additional hues may be used (e.g., green, yellow, red, blue).

FIG. 4B illustrates an example of how 2D color mapping may be used for visualization of CEUS imaging. FIGS. 5B and 6B illustrate examples of how 2D color mapping may be used for visualization of multiple parameters simultaneously for parametric CEUS imaging. Although time-of-arrival were shown in the examples shown in FIGS. 5B and 6B, the multiple parameters in the 2D color map may include time of arrival, time of flight, microbubble concentration, flow rate, and/or perfusion rate.

The 2D color mapping of ultrasound signals to brightness and/or hue based on intensity is performed after acquisition of the ultrasound signals. That is, the 2D color mapping affects the display of ultrasound images generated from the ultrasound signals, but the 2D color mapping does not affect the acquisition of the ultrasound images. Accordingly, the underlying data provided by the ultrasound signals is not altered by the 2D color mapping. Thus, while the 2D color mapping may be used to improve visualization of CEUS image data, the "original" CEUS image data may be preserved. This may be advantageous for users who use post-processing software that perform quantitative analysis on the CEUS image data as the software may require that some or all parameters of the CEUS scan remain constant over time.

Figure 7:
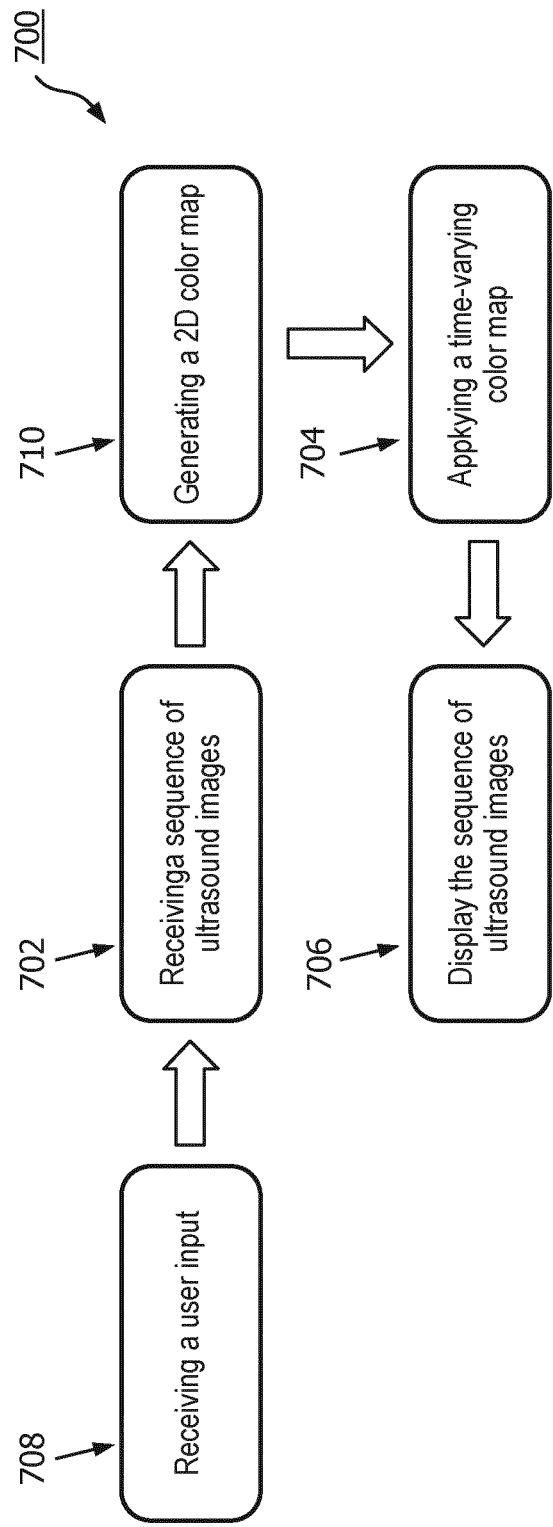
FIG. 7 is a flow chart of a method according to an embodiment of the present disclosure.

FIG. 7 is a flow chart of a method 700 according to an embodiment of the present disclosure. In some embodiments, some or all of the steps of the method 700 may be performed by the imaging system 200 shown in FIG. 2.

At block 702, a step of "receiving a sequence of ultrasound images" may be performed. In some embodiments, each image of the sequence of ultrasound images may be acquired at a different time point. In some embodiments, the sequence of ultrasound images may be received by an image processor, such as image processor 236. At block 704, a step of "applying a time-varying color map" may be performed. The time-varying color map may be applied to individual ultrasound images of the sequence in some embodiments. The time-varying color map may include a two-dimensional (2D) color map that that associates a given intensity of an ultrasound signal to a brightness value and/or a hue value that changes over time. In some embodiments, applying the time-varying color map may include assigning, for individual images of the sequence, different ones of the brightness values and/or the hue values to pixels representing a same intensity ultrasound signals acquired at different time points. In some embodiments, the applying may be performed by the image processor. At block 706, a step of "displaying the sequence of ultrasound images" may be performed. In some embodiments, the displaying may be performed by a display, such as di splay 238.

Optionally, in some embodiments, method 700 may further include block 708, where a step of "receiving a user input" may be performed. In some embodiments, the user input may be received via a user interface, such as user interface 224. In some embodiments, the user input may be used to generate the 2D color map. In some embodiments, block 708 may be performed before or after block 702. In some embodiments, block 708 may be performed simultaneously with block 702.

Optionally, in some embodiments, the method 700 may include administering a contrast agent to a subject prior to performing block 702. The contrast agent may include microbubbles in some embodiments. In some embodiments, the contrast agent may be administered by injection, such as injection into a blood vessel. In some embodiments, method 700 may include acquiring the ultrasound signals from the subject, for example, using an ultrasound probe, such as ultrasound probe 212. In some embodiments, method 700 may include generating the sequence of ultrasound images from the ultrasound signals. The sequence may be generated, at least in part, by a signal processor, a B-mode processor, a Doppler processor, a scan converter, and/or the image processor.

In some embodiments, the method 700 may further include block 710 where a step of "generating the 2D color map" may be performed. The 2D color may be generated by the image processor in some embodiments. Generating the 2D color map may include determining intensities of the ultrasound signals for all pixels of each image of the sequence of ultrasound images and adjusting an intensity scale of the 2D color map for each image of the sequence of ultrasound images so that a number of pixels in each image of the sequence of ultrasound images equal to a peak value for the at least one of the brightness or hue is equal to or less than a threshold value. In some embodiments, block 710 may be performed before block 702 and/or block 708. In some embodiments, block 710 may be performed simultaneously with block 702 and/or block 708. In some embodiments, block 710 may be performed after block 702 and/or block 708.

In some embodiments, generating the 2D color map may include analyzing all of the images of the sequence of ultrasound images to determine a parameter and adjusting an intensity scale of the 2D color map for each of the images of the sequence of ultrasound images based, at least in part, on the parameter. In some embodiments, the parameter may be a parameter of a contrast agent. In some embodiments, the parameter may include at least one of a time-to-peak, a time-of-arrival, a wash-out rate, a concentration, a flow rate, or a perfusion rate.

As described herein, time-varying 2D color maps may be used for visualizing image sequences. In some examples, a single hue may be used where the brightness values of the hue corresponding to different intensities changes over time. In some examples, the hue used for the intensity scale may change over time. In still other examples, both the hue and the brightness may change relative to intensity over time. In some applications, the 2D color maps according to principles of the present disclosure may allow for better visualization of image sequences (e.g., CEUS imaging) and/or allow for simultaneous visualization of multiple parameters in parametric imaging.

In various examples where components, systems and/or methods are implemented using a programmable device, such as a computer-based system or programmable logic, it should be appreciated that the above-described systems and methods can be implemented using any of various known or later developed programming languages, such as "C", "C++", "FORTRAN", "Pascal", and the like. Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform functions of the systems and/or methods described herein. For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods described above.

In view of this disclosure it is noted that the various methods and devices described herein can be implemented in hardware, software, and/or firmware. Further, the various methods and parameters are included by way of example only and not in any limiting sense. In view of this disclosure, those of ordinary skill in the art can implement the present teachings in determining their own techniques and needed equipment to affect these techniques, while remaining within the scope of the invention. The functionality of one or more of the processors described herein may be incorporated into a fewer number or a single processing unit (e.g., a CPU) and may be implemented using application specific integrated circuits (ASICs) or general purpose processing circuits which are programmed responsive to executable instructions to perform the functions described herein.

Although the present system may have been described with particular reference to an ultrasound imaging system, it is also envisioned that the present system can be extended to other medical imaging systems where one or more images are obtained in a systematic manner. Accordingly, the present system may be used to obtain and/or record image information related to, but not limited to renal, testicular, breast, ovarian, uterine, thyroid, hepatic, lung, musculoskeletal, splenic, cardiac, arterial and vascular systems, as well as other imaging applications related to ultrasound-guided interventions. Further, the present system may also include one or more programs which may be used with conventional imaging systems so that they may provide features and advantages of the present system. Certain additional advantages and features of this disclosure may be apparent to those skilled in the art upon studying the disclosure, or may be experienced by persons employing the novel system and method of the present disclosure. Another advantage of the present systems and method may be that conventional medical image systems can be easily upgraded to incorporate the features and advantages of the present systems, devices, and methods.

Of course, it is to be appreciated that any one of the examples, examples or processes described herein may be combined with one or more other examples, examples and/or processes or be separated and/or performed amongst separate devices or device portions in accordance with the present systems, devices and methods.

Finally, the above-discussion is intended to be merely illustrative of the present systems and methods and should not be construed as limiting the appended claims to any particular example or group of examples. Thus, while the present system has been described in particular detail with reference to exemplary examples, it should also be appreciated that numerous modifications and alternative examples may be devised by those having ordinary skill in the art without departing from the broader and intended spirit and scope of the present systems and methods as set forth in the claims that follow. Accordingly, the specification and drawings are to be regarded in an illustrative manner and are not intended to limit the scope of the appended claims.

What is claimed is:

1. An ultrasound imaging system comprising:
   an ultrasound probe configured to receive ultrasound signals for generating a sequence of ultrasound images; and
   a processor configured to:
   apply a time-varying color map for representing an intensity of the ultrasound signals in the sequence, wherein the time-varying color map comprises a two-dimensional (2D) color map that associates a given intensity of an ultrasound signal to both of a brightness value on one axis and a hue value on a second axis that changes over time; and
   generate individual ultrasound images of the sequence for display by assigning, in accordance with the time-varying color map, different brightness or hue values to pixels representing a same intensity ultrasound signals acquired at different points in time; and
   a display configured to display the 2D color map and at least one of the individual ultrasound images.

2. The ultrasound imaging system of claim 1, wherein the time-varying color map is generated prior to acquisition of any of the ultrasound signals and wherein the at least one of the brightness values or the hue values change over time based, at least in part, on at least one of a type of organ being imaged, a type of contrast agent used, an image acquisition setting, or a type of parameter to be studied.

3. The ultrasound imaging system of claim 1, wherein the processor is further configured to generate the time-varying color map after acquisition of at least some of the ultrasound signals.

4. The ultrasound imaging system of claim 3, wherein the at least one of the brightness value or the hue value changes over time based, at least in part, on an analysis of the at least some of the ultrasound signals.

5. The ultrasound imaging system of claim 4, wherein the at least some of the ultrasound signals corresponds to at least one image of the sequence and wherein the analysis includes determining intensities of the ultrasound signals for all pixels of the at least one image of the sequence and adjusting an intensity scale of the 2D color map for the at least one image of the sequence so that a number of pixels in the at least one image of the sequence equal to a peak value for the at least one of the brightness or hue is equal to or less than a threshold value.

6. The ultrasound imaging system of claim 4, wherein the analysis includes analyzing all of the ultrasound signals to determine a parameter and adjusting an intensity scale of the 2D color map for each of the images of the sequence based, at least in part, on the parameter.

7. The ultrasound imaging system of claim 6, wherein the parameter includes at least one of a time-to-peak, a time-of-arrival, a wash-out rate, a concentration, a flow rate, or a perfusion rate of a contrast agent.

8. The ultrasound imaging system of claim 4, wherein the analysis is performed in real time.

9. The ultrasound imaging system of claim 1, further comprising a user interface configured to receive a user input, wherein how the intensity corresponding to the at least one of the brightness or the hue changes over time is based, at least in part, on the user input.

10. A method comprising:
    receiving a sequence of ultrasound images, wherein each image of the sequence of ultrasound images is acquired at a different time point;
    applying a time-varying color map to individual ultrasound images of the sequence, wherein the time-varying color map comprises a two-dimensional (2D) color map that associates a given intensity of an ultrasound signal to both of a brightness value and a hue value that changes over time, and wherein applying the time-varying color map comprises assigning, for individual images of the sequence, different ones of the at least one of the brightness values or the hue values to pixels representing a same intensity ultrasound signals acquired at different time points; and displaying the 2D color map adjacent to the sequence of ultrasound images.

11. The method of claim 10, further comprising generating the 2D color map, wherein generating the 2D color map comprises:
   determining intensities of the ultrasound signals for all pixels of each image of the sequence of ultrasound images; and
   adjusting an intensity scale of the 2D color map for each image of the sequence of ultrasound images so that a number of pixels in each image of the sequence of ultrasound images equal to a peak value for the at least one of the brightness vale or hue value is equal to or less than a threshold value.

12. The method of claim 10, further comprising generating the 2D color map, wherein generating the 2D color map comprises:
   analyzing all of the images of the sequence of ultrasound images to determine a parameter; and
   adjusting an intensity scale of the 2D color map for each of the images of the sequence of ultrasound images based, at least in part, on the parameter.

13. The method of claim 12, wherein the parameter includes at least one of a time-of-arrival, a time-to-peak, a wash-out rate, a concentration, a flow rate, or a perfusion rate.

14. The method of claim 10, further comprising receiving a user input, wherein the user input is used to apply the 2D color map.

15. The method of claim 10, further comprising:
   administering a contrast agent to a subject;
   acquiring the ultrasound signals from the subject; and
   generating the sequence of ultrasound images from the ultrasound signals.

16. A non-transitory computer readable medium including instructions that when executed cause an ultrasound imaging system to:
   receive a sequence of ultrasound images, wherein each image of the sequence of ultrasound images is acquired at a different time point;
   apply a time-varying color map to individual ultrasound images of the sequence, wherein the time-varying color map comprises a two-dimensional (2D) color map that that associates a given intensity of an ultrasound signal to at least one of a brightness value or a hue value that changes over time, and wherein applying the time-varying color map comprises assigning, for individual images of the sequence, different ones of both the brightness values and the hue values to pixels representing a same intensity ultrasound signals acquired at different time points; and
   display the 2D color map adjacent to the sequence of ultrasound images.

17. The non-transitory computer readable medium of claim 16, further comprising instructions that when executed cause the ultrasound imaging system to:
   determine intensities of the ultrasound signals for all pixels of each image of the sequence of ultrasound images; and
   adjust an intensity scale of the 2D color map for each image of the sequence of ultrasound images so that a number of pixels in each image of the sequence of ultrasound images equal to a peak value for the at least one of the brightness or hue is equal to or less than a threshold value.

18. The non-transitory computer readable medium of claim 16, further comprising instructions that when executed cause the ultrasound imaging system to:
   analyze all of the images of the sequence of ultrasound images to determine a parameter of a contrast agent; and
   adjust an intensity scale of the 2D color map for each of the images of the sequence of ultrasound images based, at least in part, on the parameter.

19. The non-transitory computer readable medium of claim 16, wherein the instructions define how the intensity corresponding to the at least one of the brightness value or the hue value changes over time.

20. The non-transitory computer readable medium of claim 19, wherein the instructions are based, at least in part, on a type of organ being imaged, a type of contrast agent used, an image acquisition setting, or a type of parameter to be studied.

* * * * *